Dec. 23, 1952    L. E. LOVERIDGE    2,623,121
WAVE GUIDE
Filed April 28, 1950
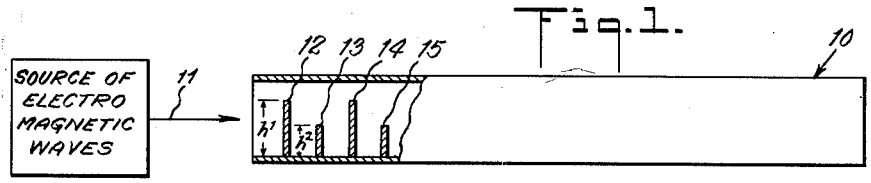
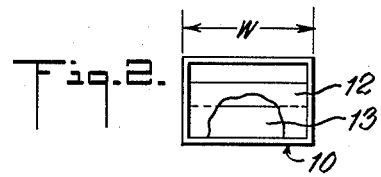
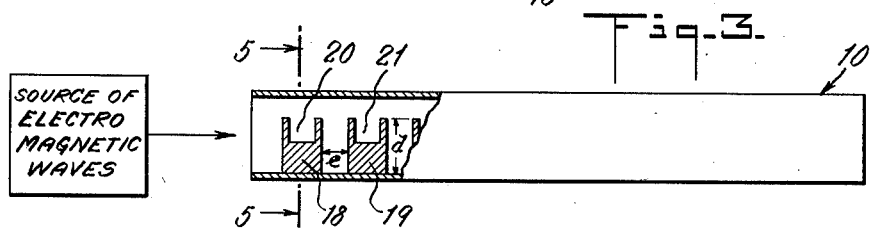
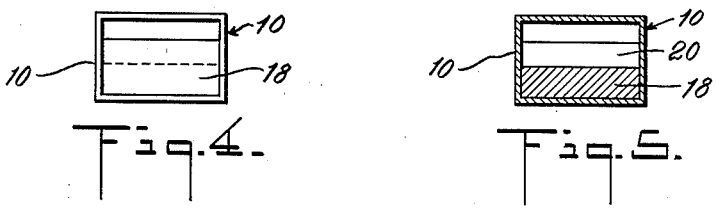
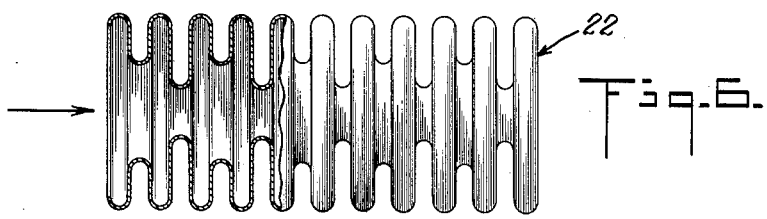
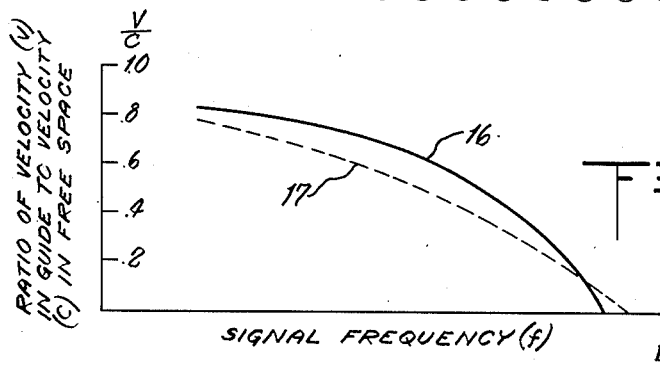
LAWRENCE E. LOVERIDGE
INVENTOR.
BY John J. Rogan
ATTORNEY Patented Dec. 23, 1952

2,623,121

UNITED STATES PATENT OFFICE 2,623,121

WAVE GUIDE

Lawrence E. Loveridge, Rutherford, N. J., assignor to National Union Radio Corporation, Orange, N. J., a corporation of Delaware Application April 28, 1950, Serial No. 158,629

7 Claims. (Cl. 178—44)

This invention relates to wave guides, and more particularly to hollow wave guides for use at relatively high frequencies.

A principal object of the invention relates to a novel wave guide structure for controlling the electromagnetic wave propagational velocity through the guide.

Another principal object is to provide a novel wave guide structure, wherein the characteristic curve of the guide relating frequency of energy flow to propagational velocity can be controlled, particularly at the frequency cut-off region.

Another object is to provide a wave guide structure wherein the wave propagational velocity through the guide can be given a relatively low value but without a corresponding increase in the wave dispersion, that is, the differential relation between wave frequency and wave propagational velocity.

A feature of the invention relates to a wave guide having a more gradual cut-off characteristic toward the higher end of the frequency spectrum to be transmitted through the guide.

Another feature relates to a wave guide having its internal peripheral configuration designed so as to impart a somewhat flattened cut-off frequency characteristic to the guide at the high frequency end of the spectrum.

A further feature relates to an improved internally-finned wave guide.

A further feature relates to a wave guide having a series of iterative internal fins, corrugations, or projections, with different predetermined lengths and depths.

A further feature relates to a wave guide having on its interior a series of iterative slots of different depths.

A still further feature relates to the novel organization, arrangement and relative location and dimensioning of parts which cooperate to provide an improved wave guide.

Other features and advantages not particularly enumerated, will be apparent after a consideration of the following detailed description and the appended claims.

In the drawing,

Fig. 1 is a front elevational view of a wave guide according to the invention.

Fig. 2 is an end view of the guide of Fig. 1, partly broken away to show the interior construction of the fins.

Fig. 3 is an elevational view of a modification of Fig. 1.

Fig. 4 is an end view of Fig. 3.

Fig. 5 is a sectional view of Fig. 3, taken along the line 5—5 thereof.

Fig. 6 is an elevational view of a further modification of Fig. 1.

Fig. 7 shows graphs explanatory of the invention.

Referring to Figs. 1 and 2, there is shown a typical hollow rectangular wave guide 10, which is adapted to have electromagnetic wave energy impressed on the input end of the guide as represented by the arrow 11. While the drawing shows a wave guide of the rectangular cross-sectional type, it will be understood that the invention is not necessarily limited thereto and can be embodied in circular wave guides, elliptical wave guides, or any other cross-sectional shape well-known in the wave guide art. Projecting internally from one wall of the wave guide, is a series of metal fins 12, 13, 14, 15, etc. In accordance with the invention, the alternate fins are of different heights "$h$" and may extend completely across the width "$w$" of the wave guide, as shown in Fig. 2. The spacing between successive fins considered along the length of the guide, is very much shorter than the shortest wavelength to be transmitted through the guide. Preferably, although not necessarily, the adjacent unequal fins 12, 13, have heights "$h^1$" and "$h^2$," so that each pair of fins forms a short-circuited line section, somewhat less than a quarter-wave in length, in which event each pair of fins may be considered as an inductive loading which is repeated along the length of the line corresponding to each such pair of fins. This inductive loading therefore acts to decrease the velocity of propagation of the electromagnetic waves through the wave guide.

If all the fins were of the same height "$h$," the relation between input signal frequency propagated through the guide, and the ratio of wave propagational velocity (V) in the guide to the wave propagational velocity (C) in free space, would be as indicated in Fig. 7 by the full line curve 16. From this curve it will be seen that there is a relatively sharp or steep curvature at the upper cut-off frequency. I have found that by using fins of unequal height, this characteristic curve can be given a more flattened characteristic with a more gradual slope at the cut-off region, as represented by the dotted line curve 17 in Fig. 7, from which it will be seen that the cut-off at the higher end of the frequency spectrum has a more gradual slope than the full line curve 16.

I have also found that by this arrangement of unequal height of fins, it is possible to lower the propagational velocity through the guide with a smaller value of wave dispersion than can be obtained were all the fins of the same height.

The net result may be considered as providing the guide with two frequency cutoff characteristics which blend to form the more gradual cutoff characteristic as represented by the curve 17.

Fig. 3 shows a modification of Fig. 1, wherein the wave guide 10 is provided on its interior with a series of metal projections 18, 19, etc., with each projection 18 provided on its upper end with a notch or cavity 20, 21, etc. The members 18, 19, are preferably spaced apart a distance "l" which is only a small fraction of the shortest wavelength to be transmitted through the guide. The depth of the slots 20 may for example be $\lambda/6$, and the depth of the slots between adjacent members 18, 19, may be $\lambda/5$, where $\lambda$ is the wave length.

It will be understood, of course, that the invention is not limited to any particular manner of forming or attaching the repeated unequal projections of the fins. For example, there is shown in Fig. 6 a circular wave guide wherein the unequal fins or projections are provided by corrugating the wall of the circular wave guide 21 so that alternate corrugations are of different depths. It will also be understood that the invention is not limited to the integral attachment of the fins 12, 13, etc., and 18, 19, etc., to the wall of the wave guide. These fins may be fashioned as a separate unit which can be inserted or telescoped into the wave guide. Furthermore, the fins need not necessarily be of metal, but can be of any suitable metallized material. Other modifications may be made in the disclosed embodiment, as will be clear to those familiar to the wave guide art, without departing from the spirit and scope of the invention.

What is claimed is:

1. A hollow wave guide having a series of iterated projections of different lengths extending transversely interiorly of the guide from one side towards the opposite side but spaced from said opposite side, alternate projections being of equal length and the intervening projections being of shorter length than the said alternate projections.

2. A hollow wave guide having on its interior a series of diaphragms each extending transversely across the guide from one wall towards the opposite wall but spaced from said opposite wall, alternate diaphragms being of equal length and the intervening diaphragms being of shorter length than said alternate diaphragms.

3. A hollow wave guide having on its interior a series of iterated spaced projections extending from one wall only of the guide with alternate projections of equal length and intervening projections of shorter length, the adjacent projections being spaced to form therebetween and with said wall of the guide a wave transmission line having inductive reactance at an operating frequency of the guide.

4. A hollow wave guide having on its interior a series of projections providing a series of alternate slots and another series of intervening slots with the intervening slots being more shallow than the said alternate slots to decrease the slope of the characteristic curve of the guide relating wave propagational velocity to cut-off frequency.

5. A hollow wave guide according to claim 4, in which said alternate slots are dimensioned to act as short-circuited lines of less than one-quarter wavelength at one operating frequency of the guide, and the said intervening slots are dimensioned to act as short-circuited quarter-wave lines at a different operating frequency of the guide.

6. In combination, a hollow metallic rectangular wave guide, means to excite the interior of said guide with electromagnetic waves, a series of interior projections of the same length extending from one wall of said guide and spaced from the opposite wall and providing a normal predetermined upper frequency cut-off limit to the guide, and another series of intervening interior projections extending from said one wall of said guide and spaced from the opposite wall but of shorter length than the first series and imparting to the guide in combination with said first series an upper frequency cut-off limit which is higher than said normal upper frequency cut-off limit.

7. A hollow wave guide having its wall corrugated to provide a series of iterated internal fins with successive fins of different length transversely of the guide and with the width of each corrugation less than one-quarter wavelength at the operating frequency of the guide.

LAWRENCE E. LOVERIDGE.

REFERENCES CITED

The following references are of record in the file of this patent:

UNITED STATES PATENTS

| Number | Name | Date |
| --- | --- | --- |
| 781,939 | Fulton | Feb. 7, 1905 |
| 2,432,093 | Fox | Dec. 9, 1947 |
| 2,464,598 | Meier | Mar. 15, 1949 |
| 2,528,248 | Schlafly | Nov. 31, 1950 |